US010682736B2

(12) United States Patent
Christophersen et al.

(10) Patent No.: US 10,682,736 B2
(45) Date of Patent: Jun. 16, 2020

(54) ACCESSORY CLAMP AND SPINDLE LOCK MECHANISM FOR POWER TOOL

(71) Applicant: Black & Decker Inc., New Britain, CT (US)

(72) Inventors: Kyle J. Christophersen, Lutherville-Timonium, MD (US); Earnest N. Copeland, Jr., Perry Hall, MD (US)

(73) Assignee: Black & Decker Inc., New Britain, CT (US)

( * ) Notice: Subject to any disclaimer, the term of this patent is extended or adjusted under 35 U.S.C. 154(b) by 142 days.

(21) Appl. No.: 15/718,609

(22) Filed: Sep. 28, 2017

(65) Prior Publication Data
US 2018/0085885 A1 Mar. 29, 2018

Related U.S. Application Data

(60) Provisional application No. 62/401,332, filed on Sep. 29, 2016.

(51) Int. Cl.
B24B 23/02 (2006.01)
B23Q 3/12 (2006.01)
B24B 45/00 (2006.01)

(52) U.S. Cl.
CPC ........... *B24B 23/022* (2013.01); *B23Q 3/12* (2013.01); *B24B 45/003* (2013.01)

(58) Field of Classification Search
CPC ..... B24B 23/022; B24B 23/02; B24B 45/003; B24B 45/00; B23Q 3/12
USPC .................................. 451/359, 344
See application file for complete search history.

(56) References Cited

U.S. PATENT DOCUMENTS

| 4,467,896 | A | | 8/1984 | Sauerwein et al. |
| 4,779,382 | A | | 10/1988 | Rudolf et al. |
| RE33,335 | E | | 9/1990 | Gentischer et al. |
| 4,989,374 | A | * | 2/1991 | Rudolf ................. B24B 23/022 |
| | | | | 451/342 |

(Continued)

FOREIGN PATENT DOCUMENTS

| DE | 3414148 | 10/1985 |
| DE | 3405885 | 1/1986 |

(Continued)

OTHER PUBLICATIONS

Extended EP Search Report dated Feb. 27, 2018 issued in corresponding EP Application No. 17193831.9.

*Primary Examiner* — Robert A Rose
(74) *Attorney, Agent, or Firm* — Amir Rohani

(57) ABSTRACT

A power tool is provided including a motor driving a shaft and a drive spindle. The drive spindle includes an outer spindle rotatably driven by the shaft and an inner spindle disposed within the outer spindle. The outer spindle includes an end portion defining an engagement surface for mounting a working accessory, and the inner spindle is axially moveable along a longitudinal axis of the outer spindle but rotationally fixed to the outer spindle. A spring member is arranged to apply a biasing force on the inner spindle in a first direction with respect to the outer spindle. Securing the working accessory on the drive spindle against the engagement surface of the outer spindle applies an axial force on the inner spindle in a second direction opposite the first direction with respect to the outer spindle.

15 Claims, 9 Drawing Sheets

(56) References Cited

U.S. PATENT DOCUMENTS

| | | | |
|---|---|---|---|
| 5,022,188 A | 6/1991 | Borst | |
| 5,058,909 A | 10/1991 | Rudolf et al. | |
| 5,157,873 A | 10/1992 | Rudolf et al. | |
| 5,263,283 A | 11/1993 | Rudolf et al. | |
| 5,601,483 A | 2/1997 | Rudolf et al. | |
| 6,569,001 B2 * | 5/2003 | Rudolf | B24B 23/02 451/344 |
| 6,910,694 B2 | 6/2005 | Hartmann et al. | |
| 7,344,435 B2 * | 3/2008 | Pollak | B24B 45/006 451/342 |
| 7,438,634 B2 | 10/2008 | Habele | |
| 8,187,058 B2 | 5/2012 | Blickle et al. | |
| 8,317,574 B2 * | 11/2012 | Blickle | B24B 23/02 294/94 |
| 8,858,301 B2 | 10/2014 | Reid | |
| 9,067,293 B2 | 6/2015 | Bernardi et al. | |
| 9,174,354 B2 | 11/2015 | Zhou | |
| 9,339,904 B2 | 5/2016 | Erni | |
| 2004/0069513 A1 | 4/2004 | Wolf et al. | |
| 2015/0042052 A1 | 2/2015 | Furusawa et al. | |
| 2015/0075830 A1 | 3/2015 | Zhang et al. | |
| 2016/0045998 A1 | 2/2016 | Zhou | |

FOREIGN PATENT DOCUMENTS

| | | |
|---|---|---|
| DE | 3431901 | 3/1986 |
| EP | 0691180 | 1/1996 |
| EP | 2213416 | 1/2010 |

\* cited by examiner

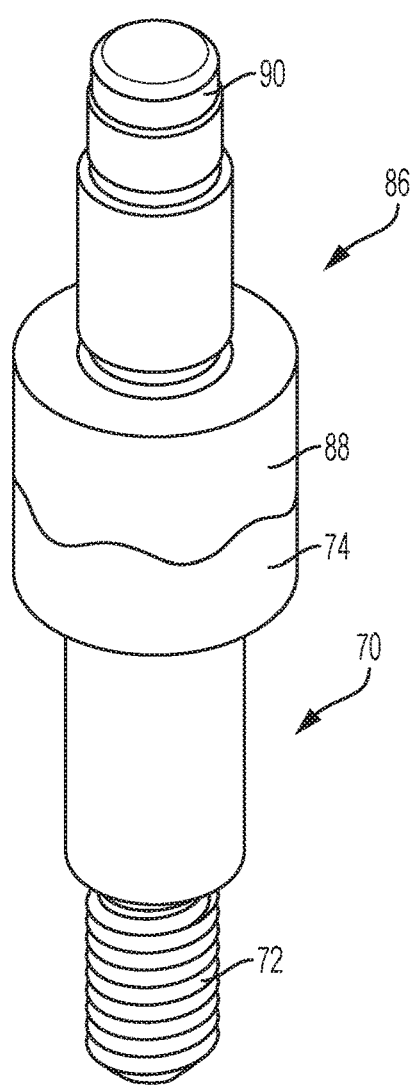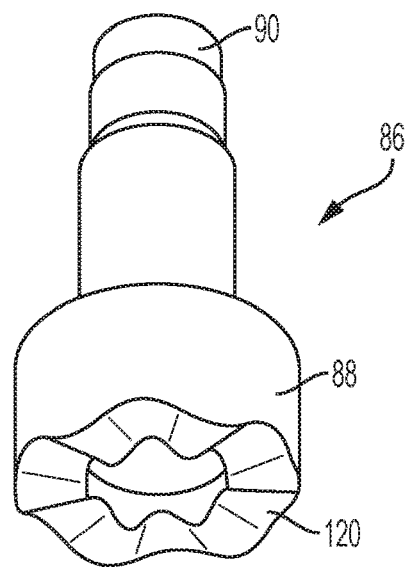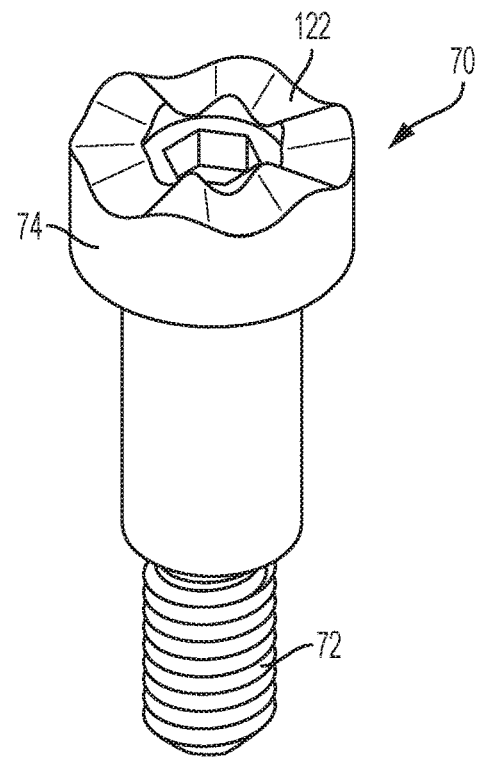
FIG. 3
FIG. 4
FIG. 5

ACCESSORY CLAMP AND SPINDLE LOCK MECHANISM FOR POWER TOOL

CROSS-REFERENCE TO RELATED APPLICATIONS

This application claims the benefit of U.S. Provisional Patent Application No. 62/401,332 filed Sep. 29, 2016, which is incorporated herein by reference in its entirety.

FIELD

This disclosure relates to a clamp mechanism, and in particular to a clamp mechanism for an abrasive accessory coupled to a spindle of a rotary power tool.

BACKGROUND

In a power tool, such as a grinder, a working accessory is mounted to a rotary spindle of the tool. The working accessory may include a threaded opening that is fastened onto a threaded end of the spindle, or may be fastened onto the end of the spindle via a nut. If the power tool motor comes to a quick stop, i.e., by braking the tool motor, a potential safety risk exists that the angular inertia of the accessory and/or the nut causes the accessory to come lose and fly off the spindle. What is needed is a mechanism that reduces this safety risk.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to an embodiment of the invention, a power tool is provided including a motor driving a shaft and a drive spindle. In an embodiment, the drive spindle includes an outer spindle rotatably driven by the shaft and an inner spindle disposed within the outer spindle. In an embodiment, the outer spindle includes an end portion defining an engagement surface for mounting a working accessory, and the inner spindle is axially moveable along a longitudinal axis of the outer spindle but rotationally fixed to the outer spindle. In an embodiment, a spring member is arranged to apply a biasing force on the inner spindle in a first direction with respect to the outer spindle. In an embodiment, the inner spindle includes a lower portion extending out of the end portion of the outer spindle and having a threaded portion arranged to be received through an opening of the working accessory. In an embodiment, securing the working accessory on the drive spindle against the engagement surface of the outer spindle applies an axial force on the inner spindle in a second direction opposite the first direction with respect to the outer spindle.

In an embodiment, the lower portion of the inner spindle is arranged to secure the working accessory to the engagement surface of the outer spindle via a nut.

In an embodiment, the outer spindle includes an inner collar on an inner surface thereof, and the inner spindle includes a top portion arranged to engage the inner collar.

In an embodiment, the spring member is arranged to engage the inner collar opposite the top portion of the inner spindle.

In an embodiment, a shoulder bolt member is provided having a head portion engaging the spring member opposite the inner collar, and a lower portion secured to the top portion of the inner spindle through the inner collar.

In an embodiment, the lower portion of the shoulder bolt member is threaded and the top portion of the inner spindle includes a corresponding threaded opening into which the lower portion of the shoulder bolt member is fastened.

In an embodiment, a depressor is arranged to engage the head portion of the shoulder bolt member opposite the spring member. In an embodiment, a depression of the depressor applies an axial force to the inner spindle in the second direction with respect to the outer spindle.

In an embodiment, a gear case is provided supporting the depressor. In an embodiment, a spring is provided applying a biasing force to the depressor in the first direction with respect to the gear case.

In an embodiment, an actuation mechanism is arranged to engage an upper portion of the depressor to apply an axial force on the depressor in the second direction. In an embodiment, the actuation mechanism includes a pivot member, a cam member pivotably attached to the pivot member, and a handle that pivots the cam member around the pivot member to apply the axial force on the depressor in the second direction.

According to another embodiment of the invention, a power tool is provided including a motor driving a shaft and a drive spindle rotatably driven by the shaft, where the drive spindle includes a first end arranged to be received through an opening of the working accessory and a second end. In an embodiment, the power tool further includes a depressor having a first end arranged to engage the second end of the drive spindle and a second end. In an embodiment, the power tool also includes an actuation mechanism arranged to apply force on the second end of the depressor to axially move the first end of the depressor into selective engagement with the second end of the drive spindle. In an embodiment, engagement of the first end of the depressor to the second end of the drive spindle rotationally locks the drive spindle.

In an embodiment, the actuation mechanism includes a pivot member, a cam member pivotably attached to the pivot member, and a handle that pivots the cam member around the pivot member to apply force on the depressor towards the drive spindle.

In an embodiment, a gear case is provided supporting the depressor, and a spring is provided applying a biasing force to the depressor with respect to the gear case away from the drive spindle.

In an embodiment, the gear case includes an annular collar disposed around the depressor. In an embodiment, the first end of the depressor is disposed between the drive spindle and a first surface of the collar, and the spring engages a second surface of the collar and the second end of the depressor.

In an embodiment, a rotation arrestor is attached around the second end of the depressor to keep the depressor from rotating with respect to the gear case. In an embodiment, the spring is disposed around the depressor between the second surface of the collar and the rotation arrestor In an embodiment, the drive spindle includes an outer spindle rotatably driven by the shaft, and an inner spindle disposed within the outer spindle. In an embodiment, the inner spindle is axially moveable along a longitudinal axis of the outer spindle but rotationally fixed to the outer spindle.

In an embodiment, the first end of the depressor and the second end of the drive spindle have correspondingly uneven mating surfaces.

BRIEF DESCRIPTION OF THE DRAWINGS

The drawings described herein are for illustrative purposes only of selected embodiments and not all possible implementations, and are not intended to limit the scope of the present disclosure.

FIGS. 3-5 depict various perspective views of a depressor and a shoulder bolt member for the spindle lock mechanism, according to an embodiment;

Corresponding reference numerals indicate corresponding parts throughout the several views of the drawings.

DETAILED DESCRIPTION

Figure 1:
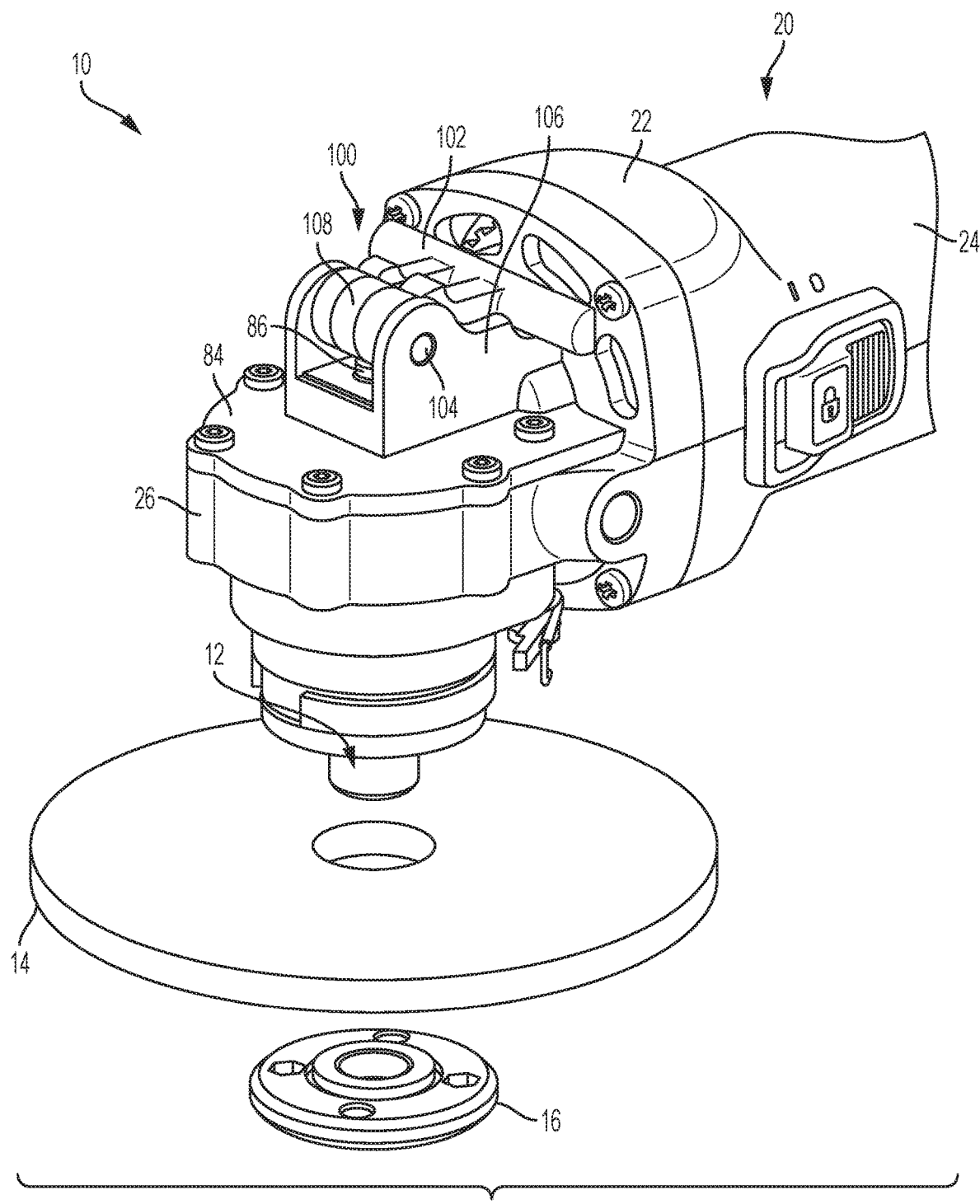
FIG. 1 depicts a partial perspective view of a rotary handheld power tool such as an angle grinder, according to an embodiment.
Figure 2:
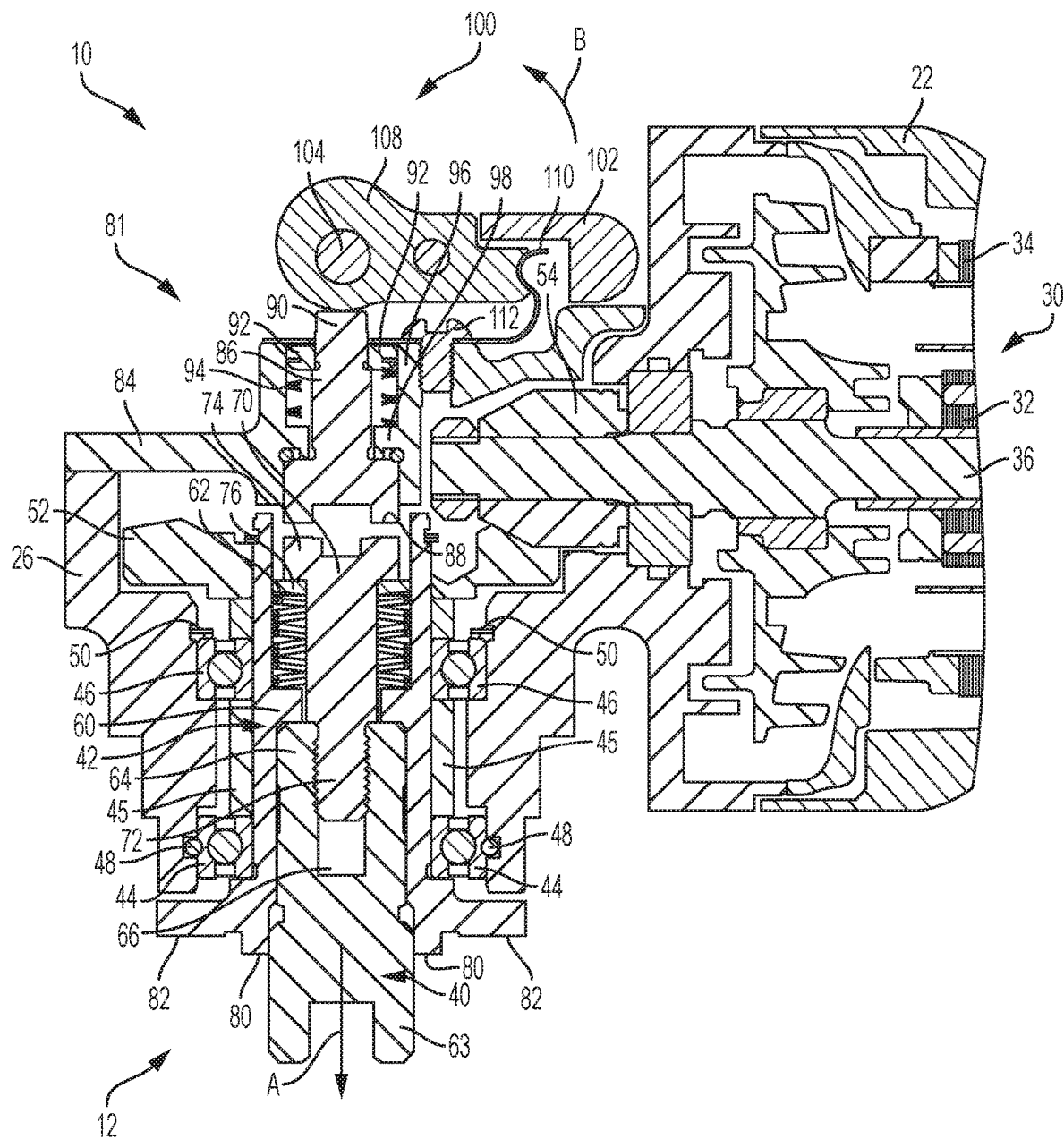
FIG. 2 depicts a partial cross-sectional side view of the power tool having an accessory clamp and spindle lock mechanism, according to an embodiment.

FIG. 1 depicts a partial perspective view of a rotary handheld power tool 10 such as an angle grinder, according to an embodiment. FIG. 2 depicts a partial cross-sectional side view of the same power tool 10, according to an embodiment. The power tool 10 includes a rotary drive spindle 12 on which a working accessory 14 such as a grinding disc or a cutting disc is mounted. The power tool 10 includes a housing 20 including a motor case 22 housing a motor assembly 30, a handle portion 24 rearward of the motor case 22, and a gear case 26 forward of the motor case 22 opposite the handle portion 24.

In an embodiment, the motor assembly 30 includes a rotor 32 disposed inside a stator 34 and driving a rotatory shaft 36. Rotary shaft 36 extends from the motor case 22 into the gear case 26 to drive the rotary drive spindle 12. An end of the drive spindle 12 may be threaded for receiving and fastening the working accessory 14 via a nut 16.

In an embodiment, power tool 10 employs a braking mechanism to quickly stop the drive spindle 12, and thus the accessory 14, from spinning in an event requiring swift tool shut down. Such an event may occur, for example, when a kickback condition is detected (i.e., when the accessory pinches a hard object on the workpiece resulting in a kickback in the user's hand). Braking the drive spindle 12 in such circumstances may reduce the force of the kickback in the user's hand. In an embodiment, it may even be desireable to brake the motor when the user lets go of the tool trigger, rather than allow the spindle 12 to coast slowly to a stop.

Braking the spindle 12 may be accomplished mechanically, e.g., via braking clutches within the gear case 26. Alternatively, the motor 30 itself may be braked electronically by applying a braking force to the motor windings. Reference is made by way of example to US Patent Publication No. 2015/0340974 (filed May 20, 2015 and assigned to Black & Decker Inc.), which describes an electronic braking system for a universal motor, and U.S. Pat. No. 8,587,231 (filed Sep. 28, 2011 and assigned to Black & Decker Inc.), which describes an electronic braking system for a brushless DC motor, both of which are incorporated herein by reference in their entireties.

A potential safety risk with utilization of a brake in a grinder is that the angular inertia of the accessory 14 and the nut 16 may cause the nut 16 to come lose and the accessory 14 to fly off the spindle 12 if the spindle 12 is stopped too quickly. To prevent this, in an embodiment, the power tool 10 includes an accessory clamping system described herein. In an embodiment, the accessory clamping system of the invention further provides a spindle locking mechanism described herein.

In an embodiment, the drive spindle 12 includes an inner spindle 40 and an outer spindle 42. In an embodiment, inner spindle 40 is disposed inside outer spindle 42 such that is it axially moveable (i.e., in the direction of the inner spindle 42 axis) relative to the outer spindle 42, but it rotates with the outer spindle 42. In an embodiment, an outer periphery of a lower portion 63 of the inner spindle 40 is threaded for fastening the nut 16 thereon. In an embodiment, inner spindle 40 may be rotationally fixed to the outer spindle 42 via, e.g., inner ribs or other retention mechanism, though in an embodiment the friction between the two may sufficiently affix the inner and outer spindles 40 and 42 rotationally.

In an embodiment, the outer spindle 42 is axially fixed (but rotationally movable) with respect to gear case 26 via a lower bearing 44 and an upper bearing 46. In an embodiment, the lower and upper bearings 44 and 46 are axially fixed to the gear case 26 via snap rings and/or O-rings 48 and 50. In an embodiment, a bearing spacer 45 is disposed between the lower and upper bearings 44 and 46 around the outer spindle 42.

In an embodiment, spindle gear 52 is also affixed to the outer surface of the outer spindle 42. Spindle gear 54 engages motor gear 54 to transfer the rotation of movement of the motor shaft 36 to the outer spindle 42.

In an embodiment, the outer spindle 42 includes a ring-shaped collar 60 on an inner surface thereof. The inner spindle 40 is located within the outer spindle 42 directly under and in contact with the collar 60. In an embodiment, a spring member 62 is positioned above the collar 60. In an embodiment, spring member 62 may include a single Belleville discs or a stack of Belleville discs alternately disposed within the outer spindle 42 on top of the collar 60. Alternatively, spring member 62 may be a compression spring, an extension spring, a torsion spring, etc.

In an embodiment, a top portion 64 of the inner spindle 40 is formed as a threaded nut including an axial opening 66 with inner threads.

In an embodiment, a shoulder bolt member 70 is provided and received from the top of the outer spindle 42. In an embodiment, a lower portion 72 of the shoulder bolt member 70 is threaded and shaped to engage the threaded opening 66 of the inner spindle 40. In an embodiment, bolt head 74 engages the top of the spring member 62 via a washer 76. In an embodiment, in this manner, the shoulder bolt member 70 sets the preload on the spring member 62.

In an embodiment, abrasive disc 14 is mounted to the spindle 12 around the flange 80 and nut 16 fastened onto the threaded lower portion 63 of the inner spindle 40 to the reasonably secure the abrasive disc 14 against the engagement surface 82 of the outer spindle 42. Thereafter, any additional torque on the nut 16 is transferred axially to the inner spindle 40 relative to the outer spindle 42 in the direction A. This force pulls down the shoulder bolt member 70 in the direction A against the force of the spring member 62. The spring member 62 biases the nut 16 and the abrasive disc 14 upwardly so as to clamp the abrasive disc 14 and the nut 16 against the engagement surface 82 of the outer spindle 42. This arrangement substantially increases the friction force between the abrasive disc 14 and the engagement surface 82. The added friction acts to hold the nut 16 and the abrasive disc 14 in place when the spindle 12 is braked and stopped quickly.

According to a further embodiment of the invention, gear case cover 84 is provided with a depressor mechanism 81 for the shoulder bolt member 70, as described herein. In an embodiment, the depressor mechanism 81 axially engages and presses down on the shoulder bolt member 70 against the biasing force of the spring member 62 when the abrasive disc 14 nut 16 are being mounted, so as to improve the mounting and engagement between the abrasive disc 14 and the engagement surface 82.

In an embodiment, the depressor mechanism 81 includes a depressor 86 disposed within gear case cover 84, and an actuation mechanism 100 provided above the depressor 86. In an embodiment, lower portion 88 of the depressor 86 engages the bolt head 74 of the shoulder bolt member 70 when the depressor 86 is pressed down. A rotation arrestor 92 is disposed around the depressor 86 in close proximity to an upper portion 90 of the depressor 86. In an embodiment, rotator arrestor 92 keeps the depressor 86 from rotating relative to the gear case cover 84.

In an embodiment, the depressor 86 is disposed within an axial opening of the gear case cover 84 defined by axial walls 96. An inner collar 98 divides the axial opening to a lower partition, where the lower portion of the depressor 86 is disposed, and an upper partition, where the upper portion 90 of the depressor 86 and the rotation arrestor 92 are disposed. In an embodiment, the inner axial walls 96 may be cylindrical and the collar 98 may be in the form of an annular rim projecting inwardly from the inner axial wall 96. Arranged between the rotation arrestor 92 and the collar 98 is a spring element 94. In an embodiment, spring element 94 may be a compression spring. In an embodiment, spring element 94 biases the rotation arrestor 92, and thus the depressor 86, upward and away from the shoulder bolt member 70.

In an embodiment, actuation mechanism 100 includes an actuation handle 102 coupled via a pivot member 104 to two axial walls 106 projecting from the gear case cover 84. Actuation handle 102 is rotatable with respect to the gear case cover 84 around the pivot member 104. A middle part of the actuation handle 102 includes a cam member 108 located around the pivot member 104. In an embodiment, cam member 108 is shaped such that, when the actuation handle 102 is rotated around the pivot axis of the pivot member 104 in the rotational direction B, the cam member 108 engages and gradually presses down on the upper portion 90 of the depressor 86.

Accordingly, in an embodiment, rotation of the actuation handle 102 presses down on the depressor 86 against the biasing force of the spring element 94. This action causes the depressor 86 to in turn press down on the shoulder bolt member 70 against the biasing force of the spring member 62. After the abrasive disc 14 and nut 16 are secured to the drive spindle 12, rotation of the handle 102 against the rotational direction B releases the depressor 86 from engagement with the shoulder bolt member 70, allowing the biasing force of the spring member 62 to pull the inner spindle 40 upward, thus clamping the abrasive disc 14 and the nut 16 against the engagement surface 82 of the outer spindle 42.

In an embodiment, a spring latch member 110 is provided for locking the actuation handle 102 in its default (unloaded) position. Spring latch member 110 is secured to the gear case cover 84 via a fastener 112 and latches the actuation handle 102 in its default (unloaded) position as shown in FIG. 2.

Referring now to FIGS. 3-5, the perspective views of the depressor 86 and the shoulder bolt member 70 are depicted, according to an embodiment. In an embodiment, a lower surface 120 of the lower portion 88 of the depressor 86 includes an uneven surface, e.g., one having a sinusoidally-waved profile. In an embodiment, an upper surface 122 of the bolt head 74 of the shoulder bolt member 70 similarly has a corresponding uneven surface that mates with the lower surface 120 of the depressor 86 when the depressor 86 is pressed against the shoulder bolt member 70. In this manner, the depressor 86 rotationally locks the shoulder bolt member 70 when the actuation mechanism 100 is actuated by the user. As such, the depressor 86 together with the actuation mechanism 100 rotationally locks the spindle 12 to prevent the spindle 12 from rotating when the nut 16 is being fastened on the spindle 12.

FIGS. 6-11 depict perspective and cross-sectional views of power tool 10 as the abrasive disc 14 and nut 16 are mounted on the spindle 12, according to an embodiment.

Figure 6:
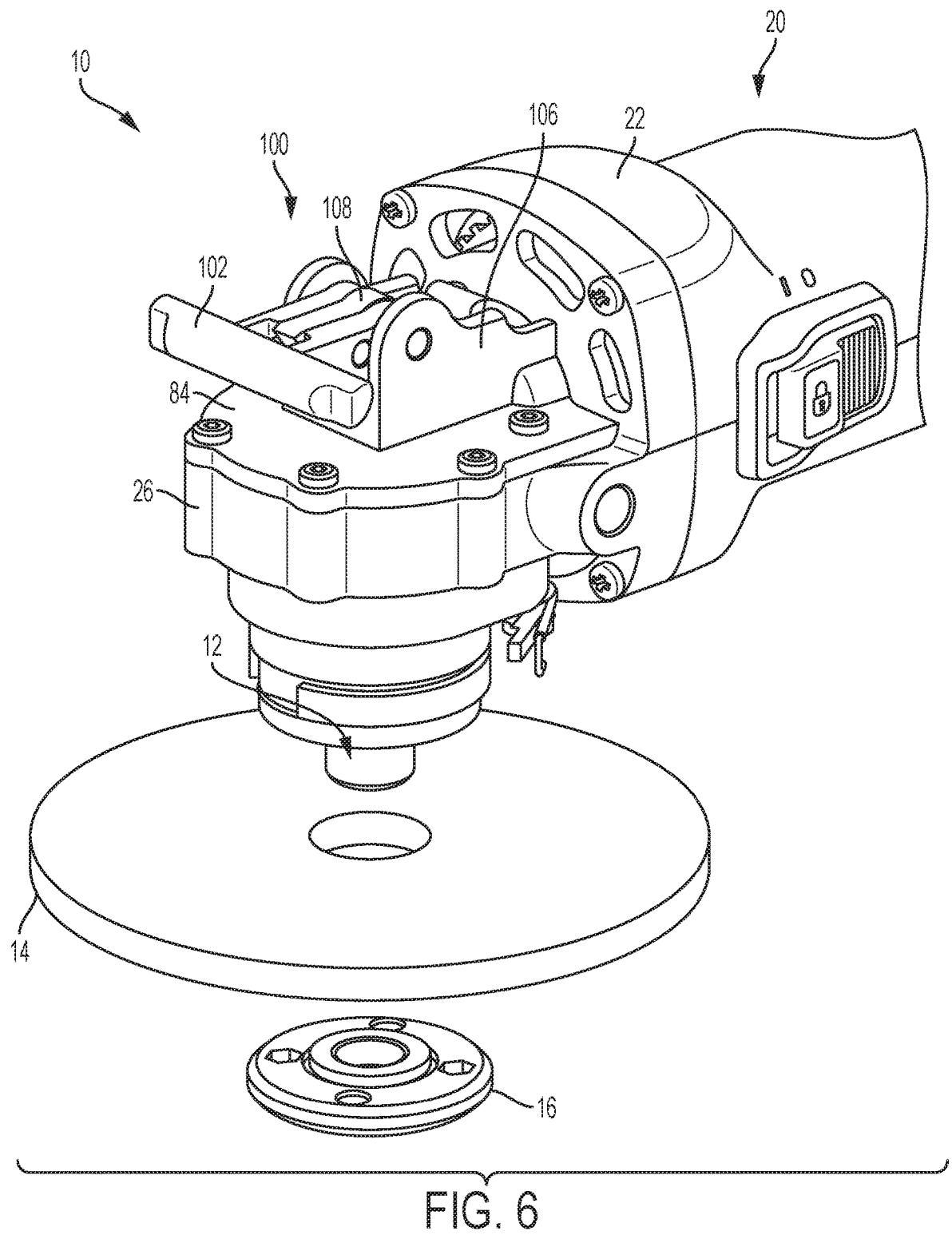
FIGS. 6 and 7 depict partial perspective and cross-sectional side views of the power tool prior to an abrasive disc being mounted, with the accessory clamp and spindle lock mechanism in the downward position, according to an embodiment.
Figure 7:
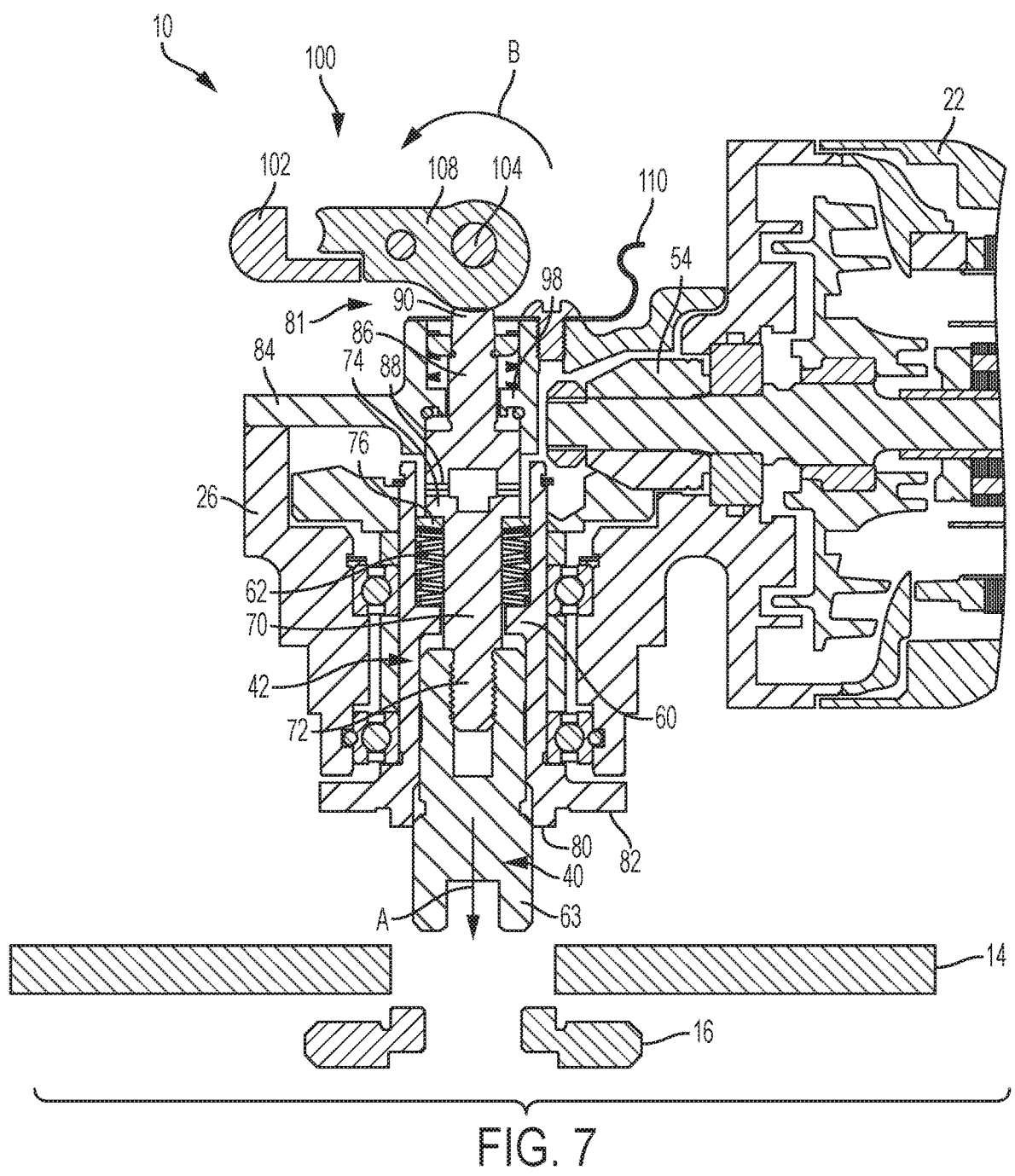

In an embodiment, as shown in FIGS. 6 and 7, the prior to the abrasive disc 14 and nut 16 being mounted on the spindle 12, the actuation handle 102 of the actuation mechanism 100 is rotated in the direction B away from the motor case 22. This rotation causes the cam member 108 to engage and gradually press down on the upper portion 90 of the depressor 86, which in turn engages and presses down the shoulder bolt member 70 against the biasing force of the spring member 62. The depressor 86 also locked the shoulder bolt member 70 against rotation. Shoulder bolt member 70 axially moves the inner spindle 40 inside the outer spindle 42 in the direction A.

Figure 8:
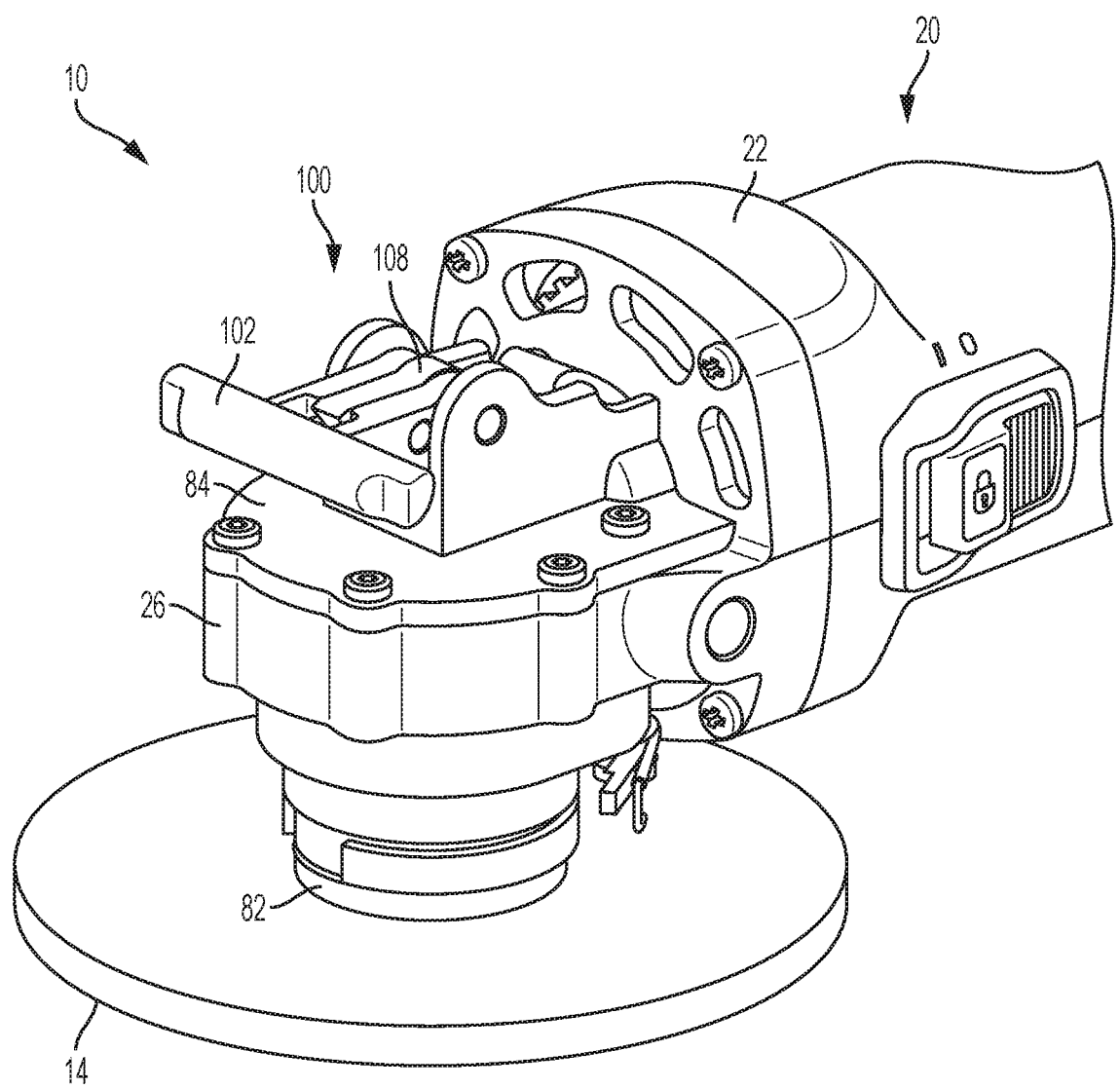
FIGS. 8 and 9 depict partial perspective and cross-sectional side views of the power tool after the abrasive disc is mounted, with the accessory clamp and spindle lock mechanism in the downward position, according to an embodiment.
Figure 9:
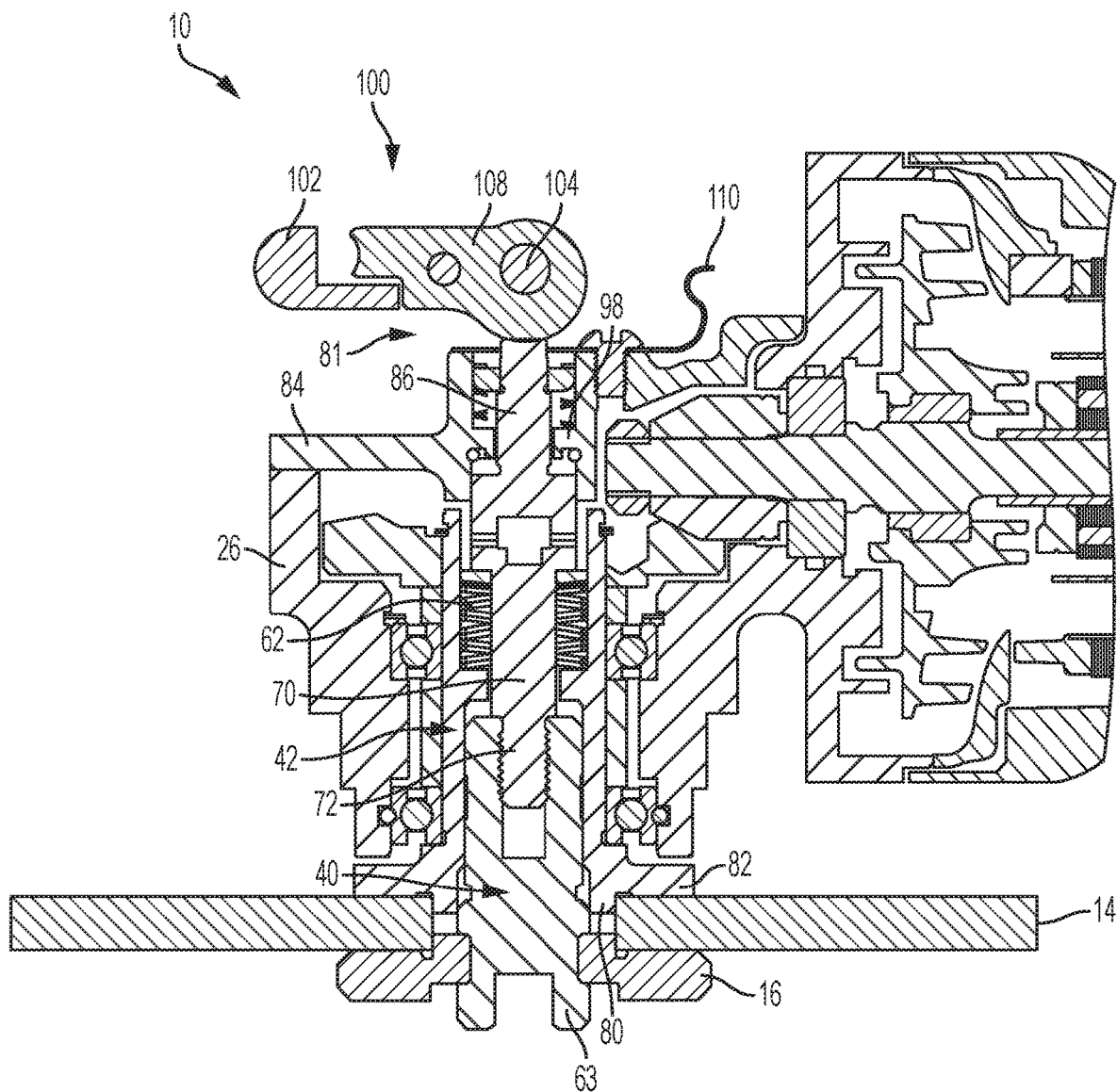

Then, in an embodiment, as shown in FIGS. 8 and 9, the abrasive disc 14 is mounted against the engagement surface 82 of the outer spindle 42 and the nut 16 is tightened onto the threaded lower portion 63 of the inner spindle 40.

Figure 10:
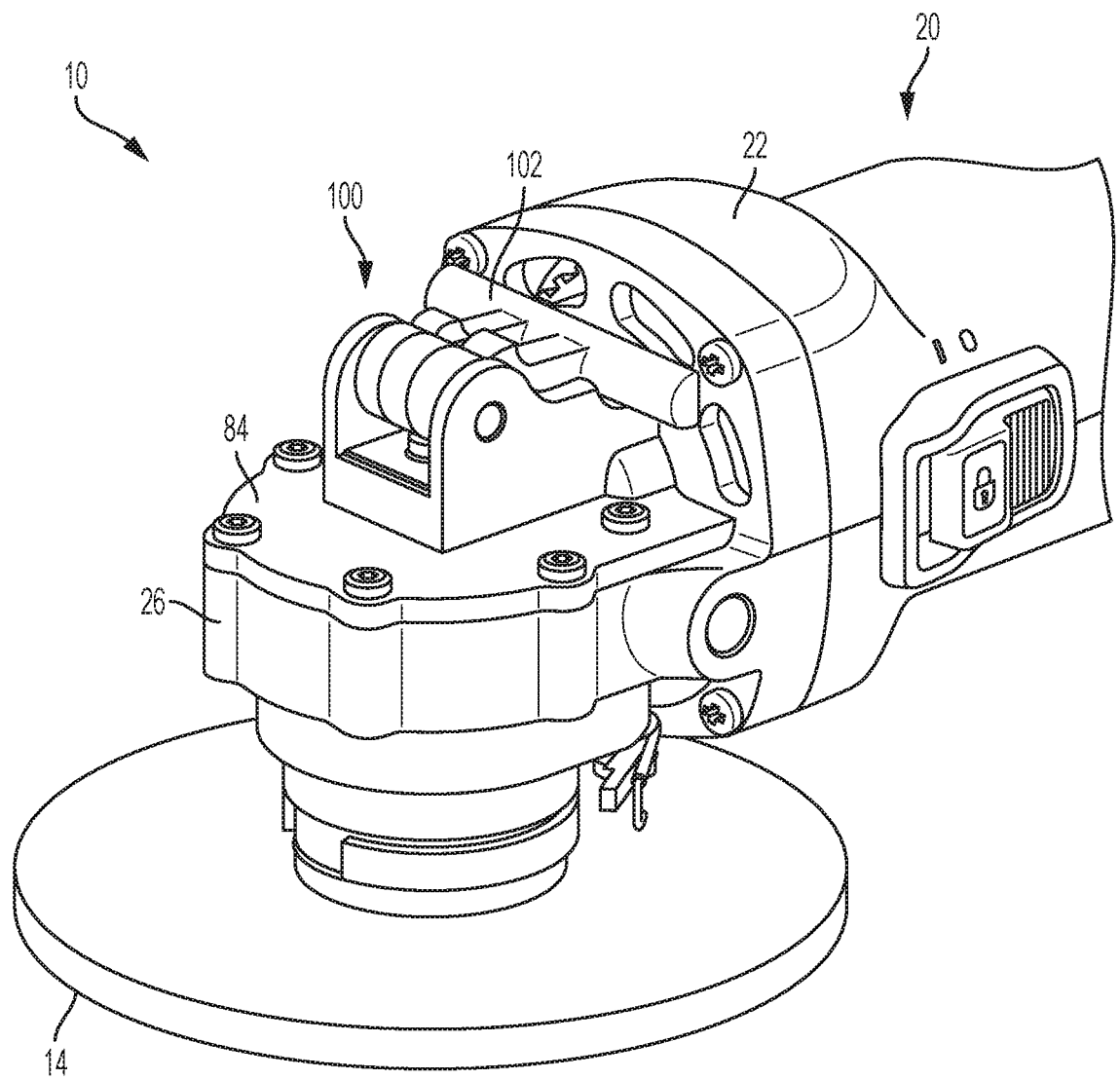
FIGS. 10 and 11 depict partial perspective and cross-sectional side views of the power tool after the abrasive disc is mounted, with the accessory clamp and spindle lock mechanism in the upward position, according to an embodiment.
Figure 11:
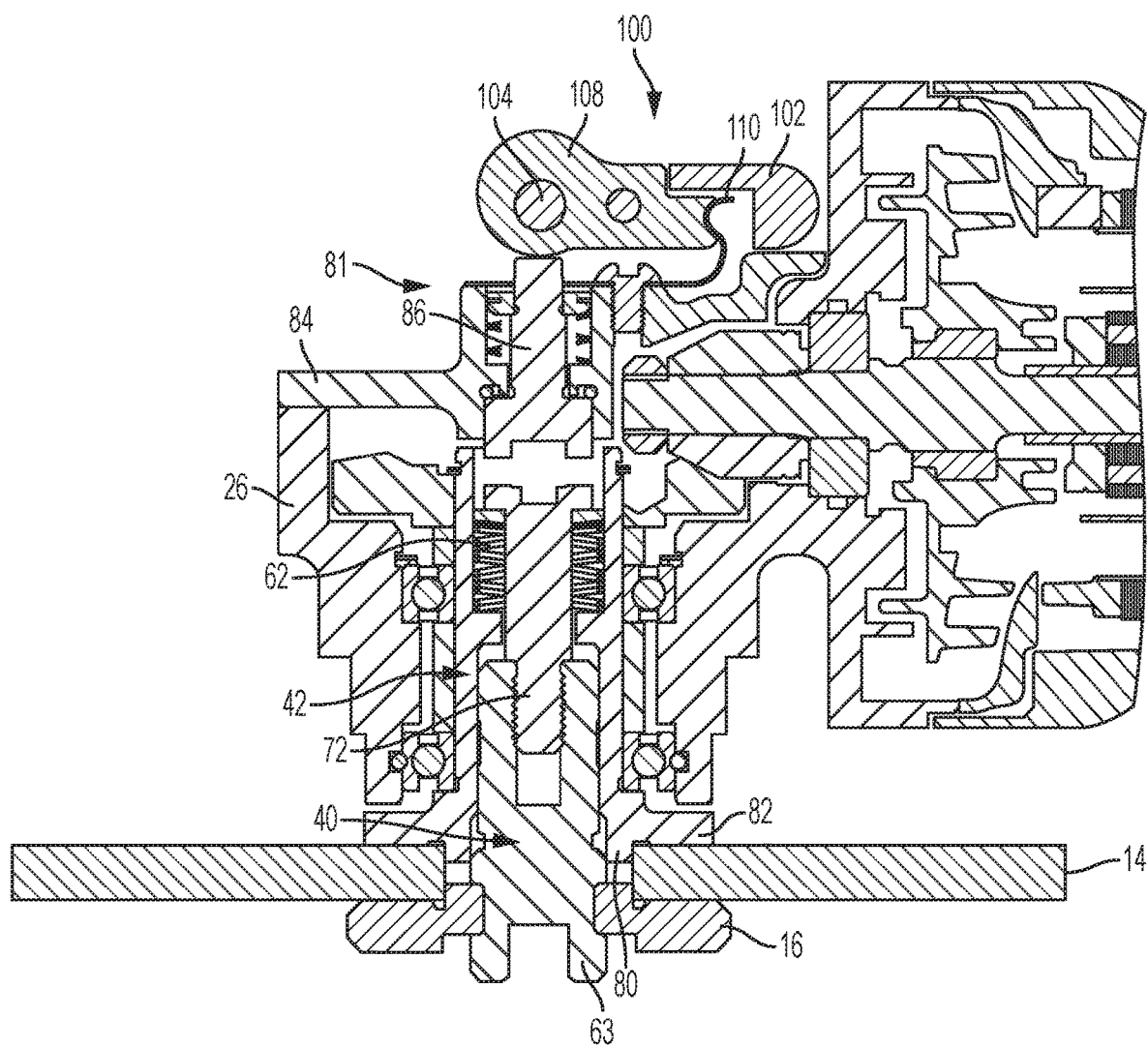

Finally, in an embodiment, as shown in FIGS. 10 and 11, the actuation handle 102 is turned against direction B and towards the motor case 22, disengaging the depressor 86 from the shoulder bolt member 70. Disengagement of the depressor 86 allows the inner and outer spindles 40 and 42 to rotate freely with the rotation of the motor shaft 36. In addition, disengagement of the depressor 86 allows the spring member 62 to bias the shoulder bolt member 70 upwardly and away from the abrasive disc 14, thus increasing the friction force of the abrasive disc 14 against the engagement surface 82 of the outer spindle 42.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A power tool comprising:
a motor driving a shaft;
a drive spindle including an outer spindle rotatably driven by the shaft and an inner spindle disposed within the outer spindle, the outer spindle having an end portion defining an engagement surface for mounting a working accessory, the inner spindle being axially moveable along a longitudinal axis of the outer spindle but rotationally fixed to the outer spindle; and
a spring member arranged to apply a biasing force on the inner spindle in a first direction with respect to the outer spindle,
wherein the inner spindle includes a lower portion extending out of the end portion of the outer spindle and arranged to be received through an opening of the working accessory, the lower portion of the inner spindle including a threaded portion on an outer surface thereof, the lower portion of the inner spindle being receivable through the opening of the working accessory in a direction from an upper surface of the working accessory towards a lower surface thereof as the upper surface of the working accessory moves into contact with the engagement surface of the outer spindle, the threaded portion of the inner spindle being fastened either directly to a threaded portion of the opening of the working accessory or to a threaded nut provided in contact with the lower surface of the working accessory to secure the working accessory on the drive spindle, and
wherein securing the working accessory on the drive spindle against the engagement surface of the outer spindle applies an axial force on the inner spindle in a second direction opposite the first direction with respect to the outer spindle.

2. The power tool of claim 1, wherein the outer spindle comprises an inner collar on an inner surface thereof, and the inner spindle comprises a top portion arranged to engage the inner collar.

3. The power tool of claim 2, wherein the spring member is arranged to engage the inner collar opposite the top portion of the inner spindle.

4. The power tool of claim 3, further comprising a shoulder bolt member having a head portion engaging the spring member opposite the inner collar, and a lower portion secured to the top portion of the inner spindle through the inner collar.

5. The power tool of claim 4, wherein the lower portion of the shoulder bolt member is threaded and the top portion of the inner spindle includes a corresponding threaded opening into which the lower portion of the shoulder bolt member is fastened.

6. The power tool of claim 4, further comprising a depressor arranged to engage the head portion of the shoulder bolt member opposite the spring member, wherein a depression of the depressor applies an axial force to the inner spindle in the second direction with respect to the outer spindle.

7. The power tool of claim 6, further comprising a gear case supporting the depressor, and a spring applying a biasing force to the depressor in the first direction with respect to the gear case.

8. The power tool of claim 6, further comprising an actuation mechanism arranged to engage an upper portion of the depressor to apply an axial force on the depressor in the second direction, the actuation mechanism comprising a pivot member, a cam member pivotably attached to the pivot member, and a handle that pivots the cam member around the pivot member to apply the axial force on the depressor in the second direction.

9. A power tool comprising:
a motor driving a shaft;
a drive spindle including an outer spindle rotatably driven by the shaft and an inner spindle disposed within the outer spindle, the outer spindle having an end portion defining an engagement surface for mounting a working accessory, the inner spindle including a first end arranged to be received through an opening of the working accessory and a second end;
a depressor having a first end and a second end, the first end extending into the outer spindle to selectively engage the second end of the inner spindle within the outer spindle; and
an actuation mechanism arranged to apply force on the second end of the depressor to axially move the first end of the depressor into selective engagement with the second end of the inner spindle,
wherein the first end of the depressor and the second end of the inner spindle include corresponding uneven surfaces engageable to rotationally lock the inner spindle, and thereby the outer spindle, when the depressor is axially moved into engagement with the second end of the inner spindle.

10. The power tool of claim 9, wherein the actuation mechanism comprises a pivot member, a cam member pivotably attached to the pivot member, and a handle that pivots the cam member around the pivot member to apply force on the depressor towards the drive spindle.

11. The power tool of claim 9, further comprising a gear case supporting the depressor, and a spring applying a biasing force to the depressor with respect to the gear case away from the drive spindle.

12. The power tool of claim 11, wherein the gear case comprises an annular collar disposed around the depressor, the first end of the depressor being disposed between the drive spindle and a first surface of the collar, and the spring engaging a second surface of the collar and the second end of the depressor.

13. The power tool of claim 12, further comprising a rotation arrestor attached around the second end of the depressor to keep the depressor from rotating with respect to the gear case, the spring being disposed around the depressor between the second surface of the collar and the rotation arrestor.

14. The power tool of claim 9, wherein the drive spindle comprises an outer spindle rotatably driven by the shaft, and an inner spindle disposed within the outer spindle, the inner spindle being axially moveable along a longitudinal axis of the outer spindle but rotationally fixed to the outer spindle.

15. The power tool of claim 9, wherein the first end of the depressor and the second end of the drive spindle have correspondingly uneven mating surfaces.

* * * * *